Figure 1:
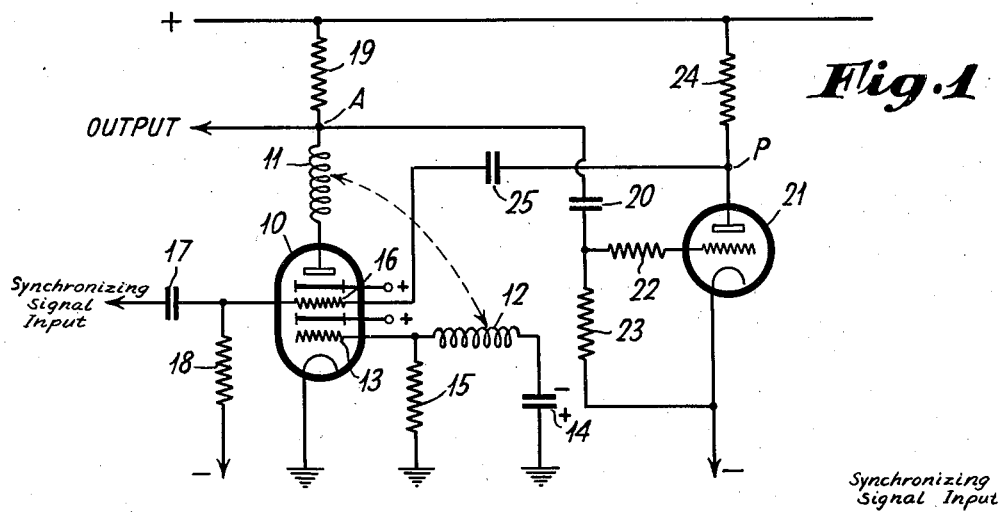

April 9, 1940.  M. GEIGER  2,196,825

OSCILLATOR

Filed April 1, 1938

INVENTOR
MAX GEIGER
BY H. S. Grover
ATTORNEY

Patented Apr. 9, 1940

2,196,825

UNITED STATES PATENT OFFICE 2,196,825

OSCILLATOR

Max Geiger, Berlin, Germany, assignor to Telefunken Gesellschaft für Drahtlose Telegraphie m. b. H., Berlin, Germany, a corporation of Germany Application April 1, 1938, Serial No. 199,431
In Germany January 30, 1937

8 Claims. (Cl. 250—36)

This invention relates to oscillators, and more particularly, to electronic oscillators of the blocking-grid type whose frequency is controlled by synchronizing impulses such as are useful in connection with cathode ray oscillographs for controlling the deflection of a cathode ray beam.

The blocking grid oscillator, as is well known in the art, comprises a thermionic tube and associated electrical networks such that inductive regeneration from the plate or anode circuit to the grid circuit is used. The grid circuit includes a capacity resistance network of suitable time constant and the magnetic coupling between the anode and grid circuit is deliberately made very high, or as commonly spoken of in the art, these two circuits are tightly coupled together. As a result, when plate current starts to flow in the plate circuit, the grid potential is raised, the connection to the windings being such that a rise in plate current produces a voltage on the grid in the positive sense, and the rise in grid potential increases the plate current which is regeneratively fed back further to the grid so that in a very short time the grid is actually driven so far positive that grid current flows from the cathode to the grid and charges the condenser in the resistance condenser network to a very high negative potential, which immediately cuts off the flow of current. The resistance across the condenser or capacity serves to discharge the condenser and by suitable choice of values for the resistance and condenser, the period at which the charge leaks off so that plate current once more begins to flow and the cycle repeated, can be controlled. Such oscillators may be controlled as to their frequency by providing a time constant for the capacity resistance circuit, such that it is greater than the actual period of one cycle of the desired frequency. By introducing a synchronizing impulse into the tube circuit so as to drive the grid positively, the plate current can be made to flow even though the condenser of the resistance capacity network has not been fully discharged. In the prior art, the synchronizing impulses were fed to the same grid to which the resistance capacity network was connected and for certain applications this is undesirable due to the reaction and effect that the synchronizing circuit had on the oscillator circuit. In the prior art, the synchronizing impulses were longer in duration than the actual plate current impulse flowing in the plate circuit of the tube.

In order to minimize this effect, a low impedance input to the blocking grid oscillator for purposes of control is necessary, and accordingly, considerable amplification was necessary in order to provide synchronizing impulses of sufficient amplitude. In order to overcome this, I have provided means for supplying synchronizing impulses to a separate control electrode contained within the thermionic tube, which impulses need not be of such high amplitude as was previously necessary, thereby eliminating the necessity of providing such high amplification.

Further than this, by my invention the synchronizing impulse does not need to be as long as the impulse in the blocking grid oscillator, so that it is not necessary in my arrangement to provide a synchronizing impulse whose amplitude remains constant for a large interval relative to the time duration of the impulse in the plate current. One of the beneficial effects from this invention is that fading or variation in the amplitude of the synchronizing impulse does not affect the frequency of the blocking grid oscillator, which effect was very prominent in blocking grid oscillators known in the prior art.

In accordance with my invention the control grid upon which the synchronizing impulses are impressed is so arranged as to assume a positive potential during the time plate current flows in the blocking oscillator. It is this particular feature which enables the use of synchronizing impulses of lesser amplitude and lesser time duration than were possible in the prior art. Accordingly, it is one of the objects of my invention to provide a new, novel and improved blocking grid oscillator whose frequency is to be controlled by synchronizing impulses.

Another object of my invention is to provide a blocking grid oscillator whose frequency is controlled by synchronizing impulses and to provide method and means whereby synchronizing impulses of smaller amplitude and shorter time duration can be used and still provide positive control of the frequency of the blocking grid oscillator.

A still further object of my invention is to provide a blocking grid oscillator in which synchronizing impulses are fed to a control grid of a thermionic tube and means for biasing this control grid positive during the time plate current flows in the thermionic tube.

Still further and other objects of my invention will become apparent to those skilled in the art upon a consideration of the drawing together with the description thereof.

Figures 2, 3:
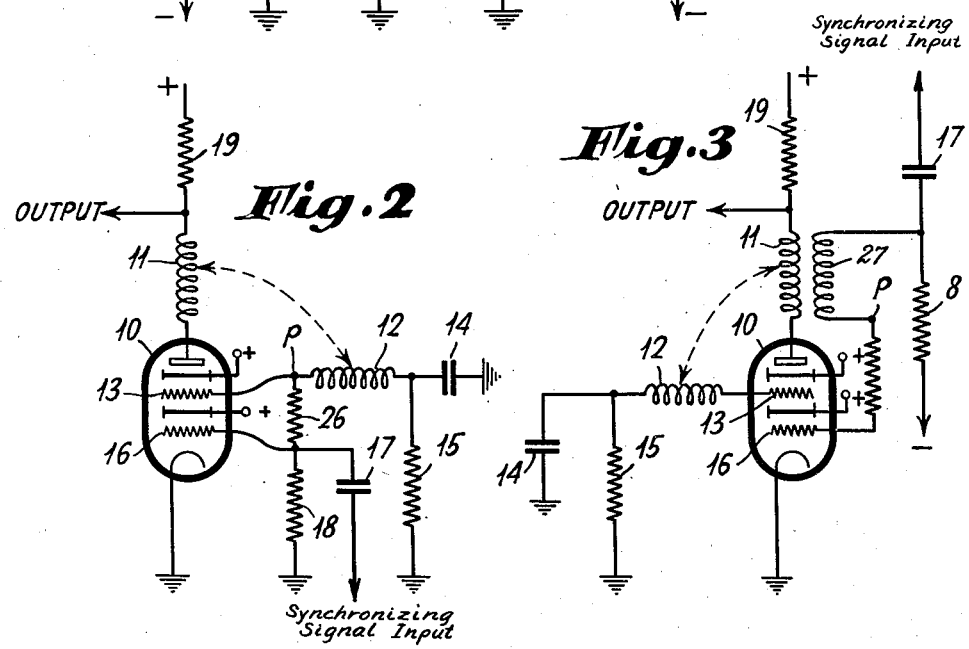
Figure 4:
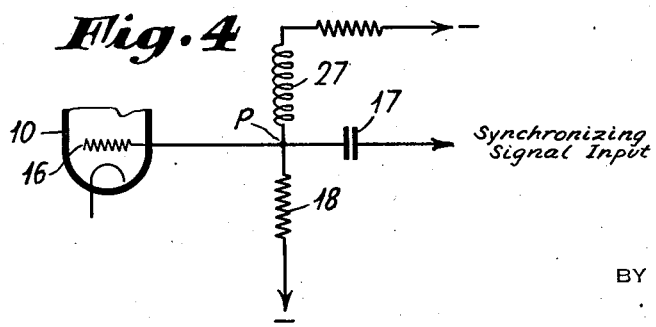

In the drawing Fig. 1 shows one embodiment of my invention schematically in which a non-linear impedance is used to provide positive bias upon the blocking grid oscillator to which synchronizing impulses are supplied;

Figs. 2 and 3 show embodiments of Fig. 1 in which the auxiliary non-linear impedance is dispensed with and linear circuit elements are used; and Fig. 4 shows a circuit modification of the method of feeding the synchronizing and positive biasing potentials to the control grid.

Referring to Fig. 1, 10 denotes a hexode tube whose plate circuit includes primary winding 11 of the feedback transformer, while the first control-grid circuit thereof contains the corresponding secondary winding 12. The circuit of the first control grid 13, in addition to the secondary winding 12, contains the condenser 14 and the resistance 15, both of which constitute the RC mesh or resistance-capacity network of the blocking oscillator. The control grid 16 is fed through a coupling condenser 17 with the synchronizing impulses which build up the synchronizing voltages across resistor 18 which should be very high in the light of what has been stated above. The lower end or terminal of the said resistance is connected with a negative potential in reference to the tube cathode. The plate circuit of the tube 10, in addition to the primary winding 11, includes also a resistance 19. The lower end of this resistance is connected through another coupling condenser 20 with the grid of a triode tube 21, this grid circuit including moreover the resistances 22 and 23. The plate circuit of tube 21 contains a resistance 24 which is associated with the control grid 16 either directly or else through a blocking condenser 25.

Now, as long as no impulse is supplied through the condenser 17 and as long as no plate current flows in the tube 10, the grid of the tube 21 is at cathode potential, and thus plate current is flowing in this tube. This current sets up a potential drop across the resistance 24 in such a way that the point P is at a more negative potential than the positive pole of the joint plate potential source of supply. However, as soon as a positive potential impulse reaches the synchronizing grid 16 by way of the condenser 17, provided that no unduly high voltage prevails across the condenser 14 in the sense of the plus and minus signs indicated in the drawing, so that the grid 13 is not maintained at negative cut-off potential, plate current will begin to flow through tube 10. As is well known, the plate current will occasion a shift of potential of the feedback grid 13 in the positive sense with the result that the plate current grows at a rapid rate. At the same time, the potential existing at terminal A decreases in the negative region because of the drop of potential occasioned by the plate current across resistance 19, so that the tube 21 becomes blocked, with the further result that the potential at point P shifts into the positive range. In other words, even if the synchronizing impulse disappears again after a short while, there remains at the synchronizing grid 16 a potential sufficiently positive to permit plate current flow, and this potential persists as long as plate current is flowing. However, as soon as this is interrupted, plate current will be initiated again in tube 21 and the potential obtaining at terminal P again shifts into the negative region with the result that by the aid of the synchronizing grid 16 plate current is prevented in tube 10 until a new synchronizing impulse comes in by way of the condenser 17.

This outline of the operation of Fig. 1 will probably make it clear at the same time that working with the scheme is feasible not only where synchronizing impulses are concerned which are briefer than the plate current shocks of the blocking oscillator, but also with impulses having a lower amplitude than those that would be required at the synchronizing grid 16 in the absence of tube 21. For it will be noticed that in the absence of tube 21 the synchronizing impulse, throughout the whole duration of the plate current pulse, would have to have an amplitude capable of producing the full plate current in tube 10, while in addition the maximum value of the synchronizing impulse must be maintained substantially constant.

The modification shown in Fig. 2 shows a connection of the synchronizing grid 16 as the first control grid of the hexode tube, to that end of the secondary winding 12 which is united with the feedback grid 13. Between the left-hand end of the secondary winding 12 which is designated by P, and the synchronizing grid 16 is interposed a resistance 26. As to the rest, the reference numerals in Fig. 2 denote similar elements shown in Fig. 1.

Through condenser 17 also positive synchronizing impulses are supplied. At terminal P the potential shifts in the positive direction as soon as plate current begins to flow through the tube 10, and as a consequence the synchronizing grid 16 is maintained at a positive potential in reference to the value which obtains at the said terminal in the presence of zero plate current, even if the synchronizing impulse should vanish again at once. Also in the case of Fig. 2 the amplitude of the synchronizing impulse may be made lower than what would be necessary in the absence of the connecting resistance 26, and this for reasons as explained before in connection with Fig. 1.

In addition to the constituent elements already indicated in connection with Figs. 1 and 2, the further modification shown in Fig. 3 comprises a winding 27 which is subject to inductive actions from primary winding 11. In Fig. 3 the tube 10 has connected in its anode the winding 11 in series with the resistance 19 and the source of positive voltage. The winding 11 is coupled both to the winding 12 connected to the grid 13 and the winding 27, which is connected serially through a resistance to the grid 16. The winding 12 has a time constant circuit comprising 14 and 15 connected thereto with the return path of said time constant circuit connected to the cathode. Synchronizing impulses are fed through the condenser 17 and appropriate bias is furnished to the control grid 16 through the resistance 8. In the said winding 27, during the time of plate current flow, a potential prevails whose sense is indicated by the plus and minus signs indicated in the Fig. 1 so that the synchronizing grid 16 even if the synchronizing impulse disappears again, stays at a potential insuring flow of current. The advantage of synchronizing impulses of a smaller amplitude than in the absence of the winding 27 holds good here for identical reasons as for Figs. 1 and 2.

It may be mentioned also that instead of connecting resistance 18 across which the synchronizing impulses are built up in series with the winding 27, it would be possible also to connect the said resistance and winding in parallel relation. A circuit organization of this kind is shown in Fig. 4.

Circuit arrangements of the kind here disclosed are especially suited for television work and for all other purposes in which current or voltage impulses must be produced at a definite rate or rhythm.

Having described my invention, what I claim is:

1. An oscillator comprising a thermionic tube having a cathode, an anode and a plurality of control electrodes, inductive energy transfer means connected between one of the plurality of control electrodes and the cathode, a resistor connected between one of the plurality of control electrodes and the cathode, an impedance path including a condenser connected between the cathode and the control electrode to which the resistor is connected, separate means to periodically impress positive potential on one of the control electrodes under the control of the transfer means connected between the anode and the cathode when current flows to the anode, and means to feed control energy to one of the plurality of control electrodes to initiate the transfer of energy from the anode to the first said one of the plurality of control electrodes.

2. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor is connected, separate thermionic means to impress periodically positive potential on one of the control electrodes under the control of the transfer means connected between the anode and the cathode when current flows to the anode, and means to feed control energy to one of the plurality of control electrodes to initiate the transfer of energy from the anode to the first said one of the plurality of control electrodes.

3. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor in connected, separate resistance means to periodically impress positive potential on one of the control electrodes under the control of the transfer means connected between the anode and the cathode when current flows to the anode, and means to feed control energy to one of the plurality of control electrodes to initiate the transfer of energy from the anode to the first said one of the plurality of control electrodes.

4. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor is connected, separate inductive means to periodically impress positive potential on one of the control electrodes under the control of the transfer means connected between the anode and the cathode when current flows to the anode, and means to feed control energy to one of the plurality of control electrodes to initiate the transfer of energy from the anode to the first said one of the plurality of control electrodes.

5. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor is connected, separate means to periodically impress positive potential on one of the control electrodes under the control of the transfer means connected between the anode and the cathode when current flows to the anode, and means to feed control energy to the same control electrode upon which is impressed the said positive potentials to initiate the transfer of energy from the anode to the first said one of the plurality of control electrodes.

6. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor is connected, separate thermionic means to periodically impress positive potential on one of the control electrodes under the control of the transfer means connected between the anode and the cathode when current flows to the anode, and means to feed control energy to the same control electrode upon which is impressed the said positive potentials to initiate the transfer of energy from the anode to the first said one of the plurality of control electrodes.

7. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor is connected, separate resistance means to periodically impress positive potential on one of the control electrodes under the control of the transfer means connected between the anode and the cathode when current flows to the anode, and means to feed control energy to the same control electrode upon which is impressed the said positive potentials to initiate the transfer of energy from the anode to the first said one of the plurality of control electrodes.

8. An oscillator comprising a thermionic tube having a cathode, an anode and a plurality of control electrodes, inductive energy transfer means connected between the anode and cathode and between one of the plurality of control electrodes and the cathode, a resistor connected between one of the plurality of control electrodes and the cathode, an impedance path including a condenser connected between the cathode and the control electrode to which the resistor is connected, separate inductive means to periodically impress positive potential on one of the control electrodes under the control of the transfer means connected between the anode and the cathode when current flows to the anode, and means to feed control energy to the same control electrode upon which is impressed the said positive potentials to initiate the transfer of energy from the anode to the first said one of the plurality of control electrodes.

MAX GEIGER.